United States Patent
Peles

(10) Patent No.: US 10,328,837 B2
(45) Date of Patent: Jun. 25, 2019

(54) VEHICULAR MOBILE STORAGE CART

(71) Applicant: Moshe Peles, Lapid (IL)

(72) Inventor: Moshe Peles, Lapid (IL)

( * ) Notice: Subject to any disclaimer, the term of this patent is extended or adjusted under 35 U.S.C. 154(b) by 0 days.

(21) Appl. No.: 15/603,481

(22) Filed: May 24, 2017

(65) Prior Publication Data

US 2017/0341556 A1 Nov. 30, 2017

(30) Foreign Application Priority Data

May 26, 2016 (IL) .......................................... 245896

(51) Int. Cl.
| | |
|---|---|
| *B60P 1/00* | (2006.01) |
| *B60P 1/02* | (2006.01) |
| *B60D 1/06* | (2006.01) |
| *B62B 3/14* | (2006.01) |
| *B62B 5/06* | (2006.01) |
| *B62B 5/00* | (2006.01) |
| *B60R 9/06* | (2006.01) |
| *B60P 1/64* | (2006.01) |
| *A63B 71/00* | (2006.01) |
| *B66F 9/06* | (2006.01) |
| *B66F 9/00* | (2006.01) |

(52) U.S. Cl.
CPC .......... *B60P 1/022* (2013.01); *A63B 71/0036* (2013.01); *B60D 1/06* (2013.01); *B60D 1/065* (2013.01); *B60P 1/6409* (2013.01); *B60R 9/06* (2013.01); *B60R 9/065* (2013.01); *B62B 3/1404* (2013.01); *B62B 5/0033* (2013.01); *B62B 5/0079* (2013.01); *B62B 5/066* (2013.01); *B66F 9/00* (2013.01); *B66F 9/06* (2013.01); *B62B 2301/04* (2013.01)

(58) Field of Classification Search
CPC .... B60P 1/022; B60P 1/6409; A63B 71/0036; B60D 1/06; B60D 1/065; B60R 9/06; B60R 9/065; B62B 3/1404; B62B 5/0033; B62B 5/0079; B62B 5/066; B66F 9/00; B66F 9/06
USPC ...................................................... 224/519
See application file for complete search history.

(56) References Cited

U.S. PATENT DOCUMENTS

| | | | | |
|---|---|---|---|---|
| 3,174,634 | A * | 3/1965 | Peck ..................... | B60P 1/4414 414/541 |
| 3,376,986 | A * | 4/1968 | Farber ...................... | B62B 1/14 414/446 |
| 3,976,283 | A * | 8/1976 | Schmit ..................... | B66D 1/04 116/173 |
| 4,056,207 | A * | 11/1977 | Spilker ................... | B21J 13/085 187/235 |
| 5,020,737 | A * | 6/1991 | Sehl ..................... | B63B 35/816 242/394 |
| 5,871,069 | A * | 2/1999 | Carmitchel .............. | B66F 9/06 187/231 |
| 6,077,024 | A | 6/2000 | Trueblood | |

(Continued)

*Primary Examiner* — Peter N Helvey
(74) *Attorney, Agent, or Firm* — Haim M. Factor

(57) ABSTRACT

A vehicular mobile storage cart, for a car having a hitch (21, 22), the cart comprising: a hitch gripping mechanism (30), connectable to the car hitch (21, 22); a lifting mechanism (40), connectable to the hitch gripping mechanism (30); and a wheel cart (10), connectable to the lifting mechanism; wherein the lifting mechanism being adapted to diminish its dimensions in a folded state thereof to allow opening a back door of a vehicle thereof when being folded.

9 Claims, 9 Drawing Sheets

(56) References Cited

U.S. PATENT DOCUMENTS

| | | | | |
|---|---|---|---|---|
| 6,164,896 | A * | 12/2000 | Cummins | B60R 9/06 224/521 |
| 6,244,813 | B1 * | 6/2001 | Cataldo | B60P 3/125 224/521 |
| 6,361,264 | B1 * | 3/2002 | Guthrie | B60R 9/065 224/521 |
| 6,409,186 | B2 | 6/2002 | Bennington | |
| 6,698,995 | B1 * | 3/2004 | Bik | B60R 9/065 224/519 |
| 7,021,644 | B1 * | 4/2006 | Master | B60D 1/00 280/480 |
| 7,101,142 | B2 * | 9/2006 | Bik | B60R 9/065 224/519 |
| 7,217,078 | B2 * | 5/2007 | Short | B65F 1/1452 224/282 |
| 7,614,637 | B1 * | 11/2009 | Kidd | B60D 1/00 224/519 |
| 8,162,192 | B1 | 4/2012 | Sanchez | |
| 9,085,207 | B1 * | 7/2015 | Sweet | B60D 1/24 |
| 2004/0164517 | A1 * | 8/2004 | Lewy | B60D 1/145 280/493 |
| 2004/0219003 | A1 | 11/2004 | Bik et al. | |
| 2004/0232184 | A1 * | 11/2004 | Moen | B60R 9/06 224/510 |
| 2005/0161906 | A1 * | 7/2005 | Thelen | B60D 1/00 280/504 |
| 2006/0228201 | A1 | 10/2006 | Lenceski | |
| 2006/0291985 | A1 * | 12/2006 | Sullivan | B60R 9/06 414/462 |
| 2007/0170218 | A1 * | 7/2007 | Robb | B60R 9/06 224/519 |
| 2007/0221695 | A1 * | 9/2007 | Winkler | B60R 9/065 224/519 |
| 2008/0100076 | A1 | 5/2008 | Potts | |
| 2009/0028679 | A1 * | 1/2009 | Smith | B60P 1/4421 414/462 |

\* cited by examiner

VEHICULAR MOBILE STORAGE CART

TECHNICAL FIELD

The present invention relates to the field of vehicle cabin accessories. More particularly, the invention relates to a vehicular mobile storage cart.

BACKGROUND ART

Relatively small cars have become increasingly popular, due to road congestion and the maintenance cost of vehicles. In order to save space, the trunks of smaller cars are appreciatively small as well, and furthermore, some such cars have no trunks at all.

A trailer is a well known solution to the object of increasing the carrying ability of a car.

FIG. 1 schematically illustrates a trailer 90, according to the prior art.

The trailer comprises a platform 94 with two wheels 92. The chassis 93 at the front side thereof outstands from the platform in order to allow a user to connect it to a car hitch (not illustrated in this figure).

US20060228201 is considered by the Applicant as the closest prior art. It discloses a portable cart which has an extendable base to elevate the cart to a proper height in order to mount it in the receiver or a trailer hitch. The extendable base is retracted, pulling up the cart wheels. This allows the cart to be towed by a vehicle. Once at the desired location, the vehicle is parked. The extendable base is extended to support the weight of the cart, which is removed from the vehicle. The cart may then be lowered and wheeled to its user site. The cart may be designed to hold baseball equipment, act as a sports training cart with first aid supplies, or material spill cleanup equipment. It may also carry food and supplies for catering, contain an outdoor mobile grill, act as a service company cart, a construction cart, an equipment cart for first responders, a pet show cart, a trade show cart, or be armored to carry ammunition and military supplies.

US20080100076 A1 is also considered by the applicant as close prior art. It discloses a cargo carrying system for use with a vehicle. The system includes a platform having roller members on an underside thereof to facilitate movement of the platform along the ground. Also included is a connection assembly which serves to permit the attachment of the platform to a vehicle. In one embodiment, both a first height adjustment mechanism and a separate, finely adjustable height mechanism are included between the connection assembly and the platform. Further included is an intermediate, slidable member used between the platform and connection member to facilitate the connection of the platform to the vehicle.

All the solutions described above have not yet provided satisfactory solutions to the problem of the required space between the car and the trailer, in order to allow a user to connect and disconnect the trailer from the car.

It is an object of the present invention to provide a solution to the above-mentioned and other problems of the prior art.

Other objects and advantages of the invention will become apparent as the description proceeds.

SUMMARY OF THE INVENTION

In one aspect, the present invention is directed to a vehicular mobile storage cart, for a car having a hitch (21, 22), the cart comprising:

(a) a hitch gripping mechanism (30), connectable to the car hitch (21, 22);
(b) a lifting mechanism (40), connectable to the hitch gripping mechanism (30), the lifting mechanism (40) comprising:
    a parallelogram frame (50) connected to the gripping mechanism (30), the frame having two horizontal bars and two vertical bars pivotally connected to each other;
    a linear actuator (45) for changing an angle between the bars;
    wherein the lifting mechanism being adapted to diminish its dimensions in a folded state thereof to allow opening a back door of a vehicle thereof when being folded; and
    two hooks (44), correspondingly with two studs of a wheel cart;
(c) a wheelcart (10) comprising:
    a cabin (11) having a handle (14); and
    two studs (15), correspondingly with the two hooks (44), each of the studs being connected to an opposite side of the cabin (11), for connecting to the hooks (44); and
    a locking mechanism, for locking the studs (15) to the hooks (44).

According to one embodiment of the invention, the locking mechanism is combined with the handle (14) of the cart, thereby allowing placing the locking mechanism in a locked state thereof by the handle.

According to one embodiment of the invention, the handle (14) is pivotally connected to the wheel cart (10), thereby allowing changing the orientation of the handle to lock the studs (15) to the hooks (44), thereby implementing the locking mechanism.

Preferably, the hitch gripping mechanism (30) comprises:
    two gripping arms (32), each having a gripping terminal (34) at one end thereof while the other end thereof is used as a handle;
    a hinge pivotally connecting the arms between the ends thereof,
    a foldable securing rod (33), connected to the arms (32) therebetween, for fixing the gripping mechanism in a locked situation thereof,
    thereby allowing placing a car hitch element (22) between the gripping terminals (34), and locking the foldable rod (33) in a straight state thereof, for gripping the car hitch element (22).

According to one embodiment of the invention, the hitch gripping mechanism is adapted to be used with a car hitch element (22) is a form of a ball.

The vehicular mobile storage cart according to claim 3, further comprising a lock (35), for preventing an unauthorized person from releasing a connection between the hitch gripping mechanism (30) and the hitch.

The vehicular mobile storage cart may comprise a motor (17), for rotating one or more of the wheels of the wheel cart.

The vehicular mobile storage cart may further comprise a hook (18) into which a pin of the lifting mechanism (40) can be placed, for safer towing of the wheel cart than without the pin.

The vehicular mobile storage cart may further comprise a mechanism for securing the studs (15) to the hooks (44), thereby preventing the wheel cart (11) from disconnecting from the hooks (44).

In another aspect, the present invention is directed to a vehicular mobile storage cart, for a car having a hitch (21, 22), the cart comprising:

a hitch gripping mechanism (30), connectable to the car hitch (21, 22);

a lifting mechanism (40), connectable to the hitch gripping mechanism (30); and a wheel cart (10), connectable to the lifting mechanism; wherein the lifting mechanism being adapted to diminish its dimensions in a folded state thereof to allow opening a back door of a vehicle thereof when being folded.

The reference numbers have been used to point out elements in the embodiments described and illustrated herein, in order to facilitate the understanding of the invention. They are meant to be merely illustrative, and not limiting. Also, the foregoing embodiments of the invention have been described and illustrated in conjunction with systems and methods thereof, which are meant to be merely illustrative, and not limiting.

BRIEF DESCRIPTION OF DRAWINGS

Preferred embodiments, features, aspects and advantages of the present invention are described herein in conjunction with the following drawings.

Figure 1:
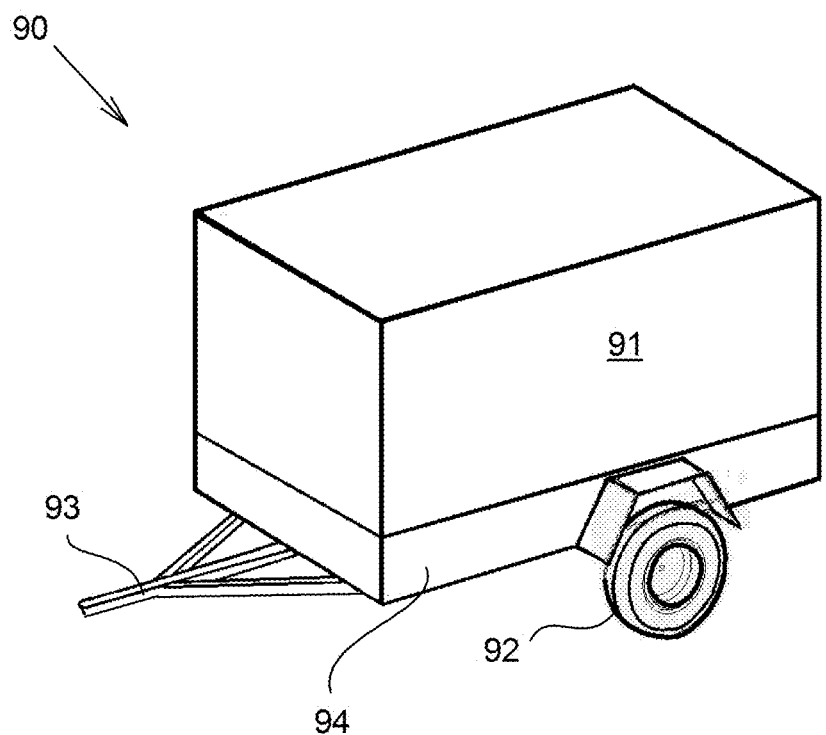
FIG. 1 illustrates a trailer 90, according to the prior art.
Figure 2A:
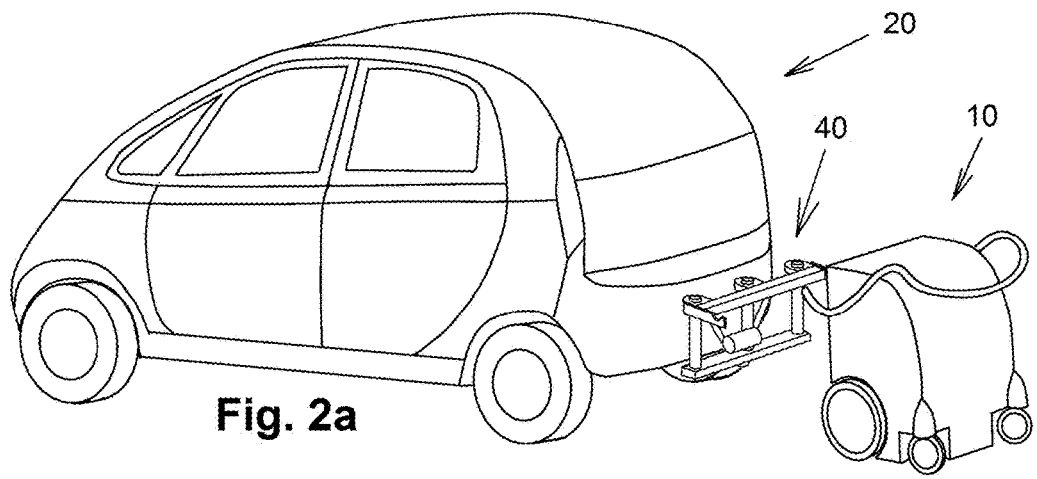
Figure 2B:
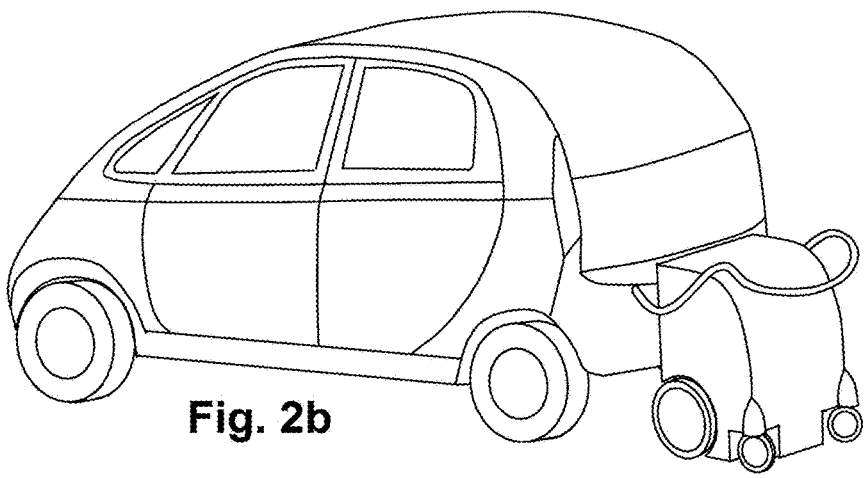
Figure 2C:
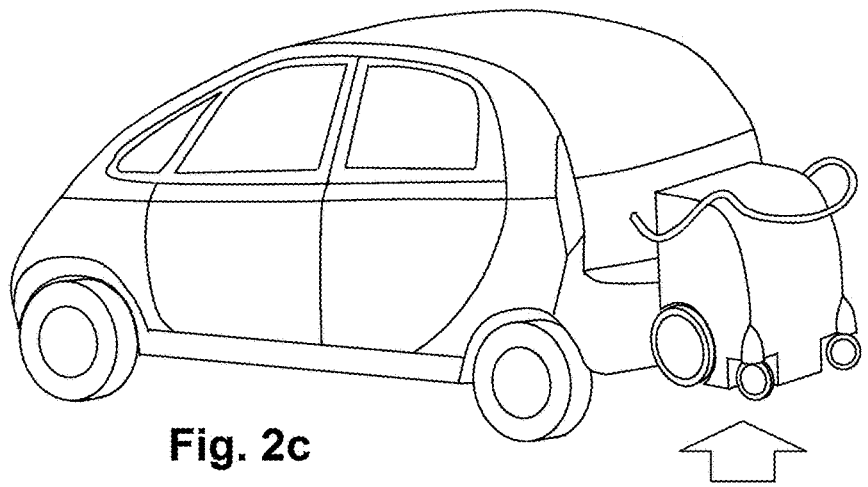

Each of FIGS. 2a, 2b and 2c schematically illustrates a stage of mounting a vehicular mobile storage cart to a car, according to one embodiment of the invention.

Figure 3:
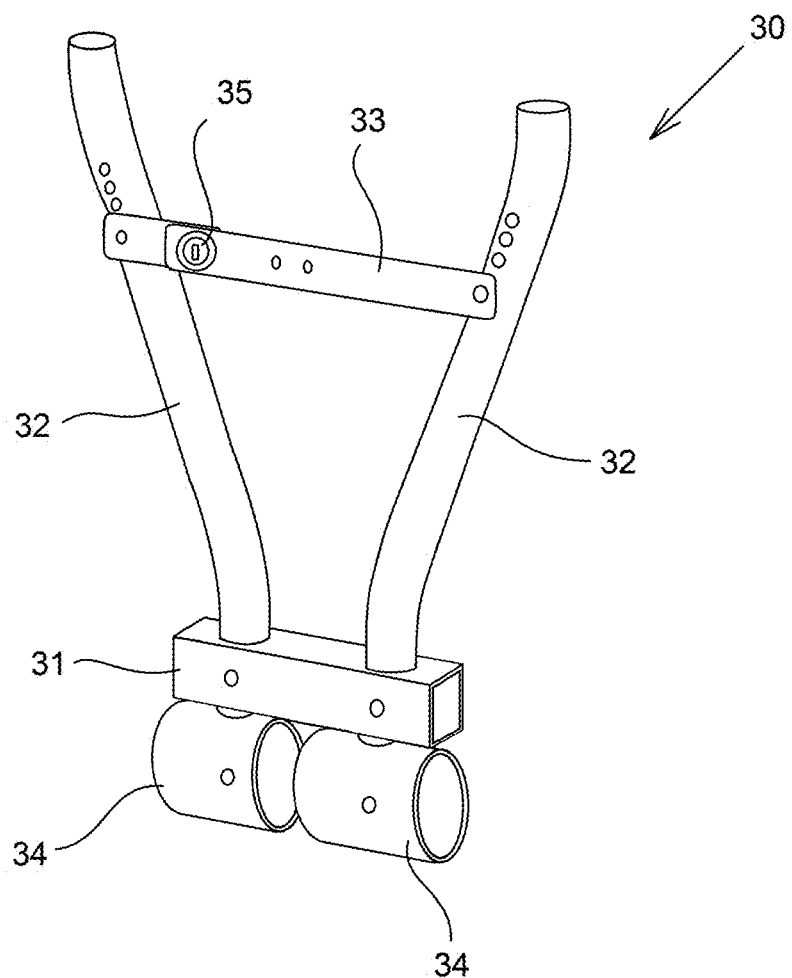

FIG. 3 is a perspective view which schematically illustrates a gripping mechanism 30, according to one embodiment of the invention.

Figure 4A:
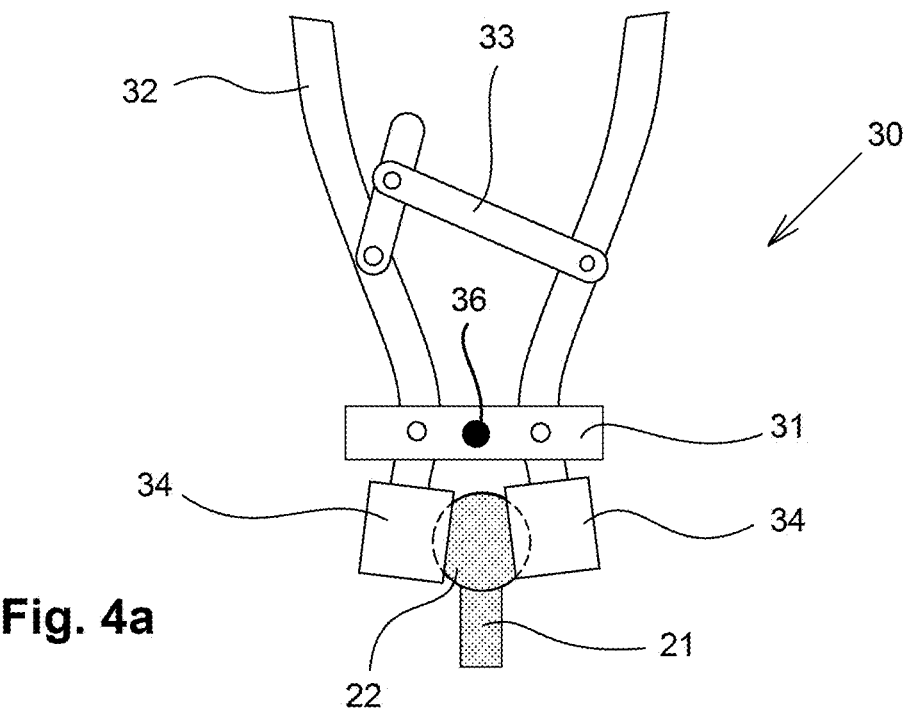
Figure 4B:
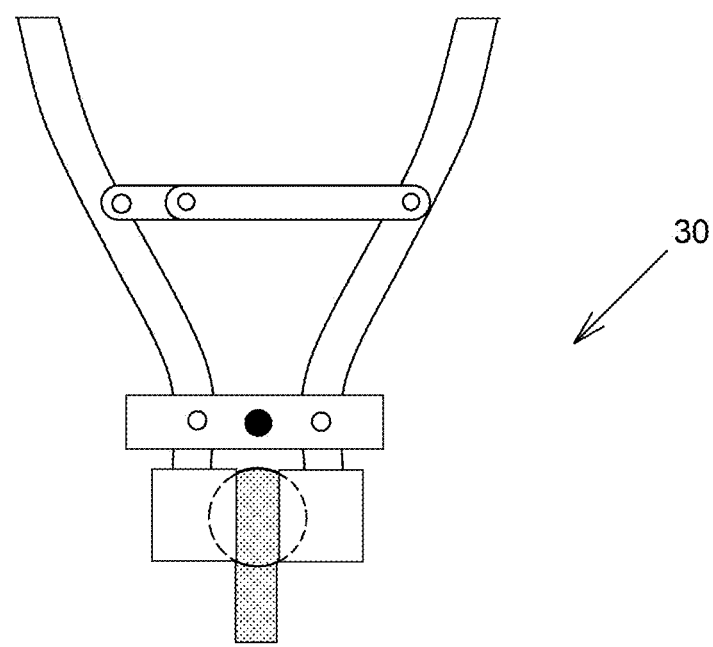

Each of FIGS. 4a and 4b schematically illustrates the operation of a gripping mechanism 30, according to one embodiment of the invention.

Figure 5A:
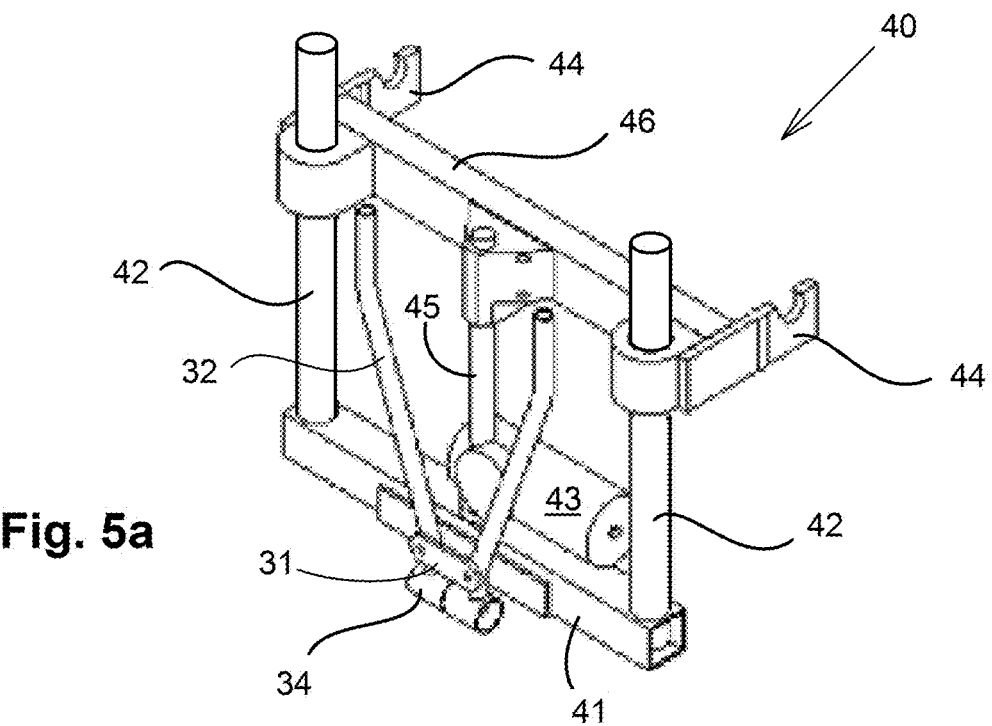
Figure 5B:
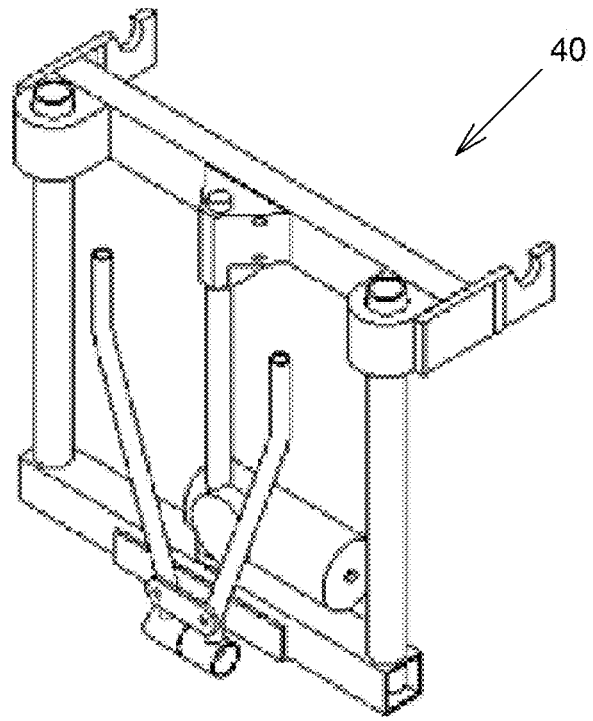

Each of FIGS. 5a and 5b schematically illustrates the operation of a lifting mechanism 40, according to one embodiment of the invention.

Figure 6A:
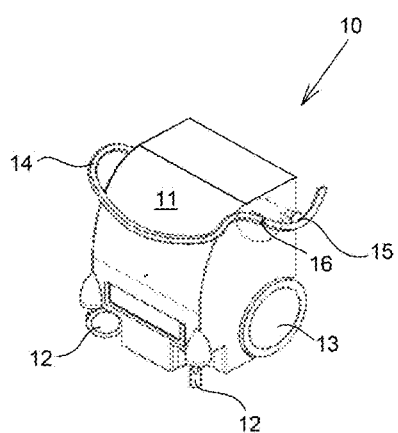

FIG. 6a schematically illustrates the wheel cart 10 in a situation in which it carries shopping, according to one embodiment of the invention.

Figure 6B:
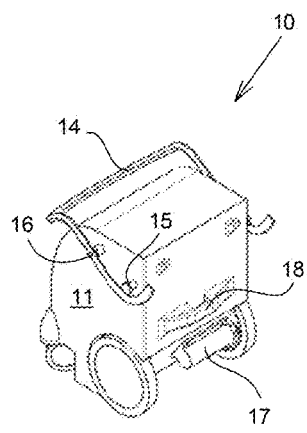

FIG. 6b schematically illustrates the wheel cart 10 in a situation of rotating the handle by a user along hinge 16.

Figure 6C:
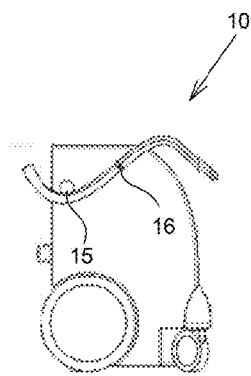

FIG. 6c schematically illustrates the wheel cart 10 in a situation in which the wheel cart is towed by a car.

Figure 7A:
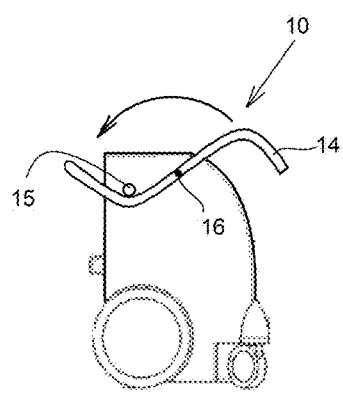

FIG. 7a schematically illustrates the wheel cart 10 in a situation in which it carries shopping, according to one embodiment of the invention.

Figure 7B:
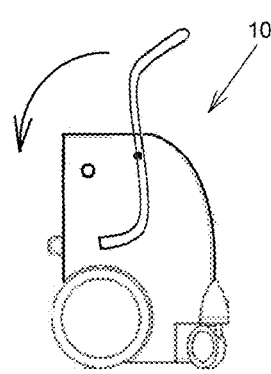

FIG. 7b schematically illustrates the wheel cart 10 in a situation of a user rotating the handle along hinge 16.

Figure 7C:
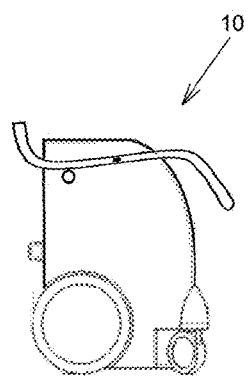

FIG. 7c schematically illustrates the wheel cart 10 in a situation in which the wheel cart is towed by a car.

Figure 8A:
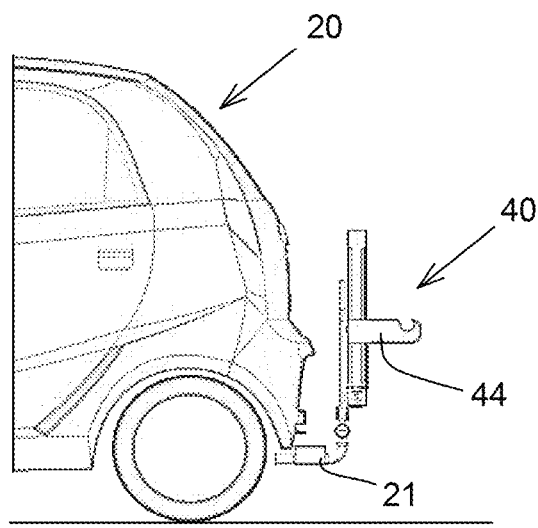

FIG. 8a is a side view schematically illustrating a car 20 in which is installed a wheel cart 10, according to one embodiment of the invention.

Figure 8B:
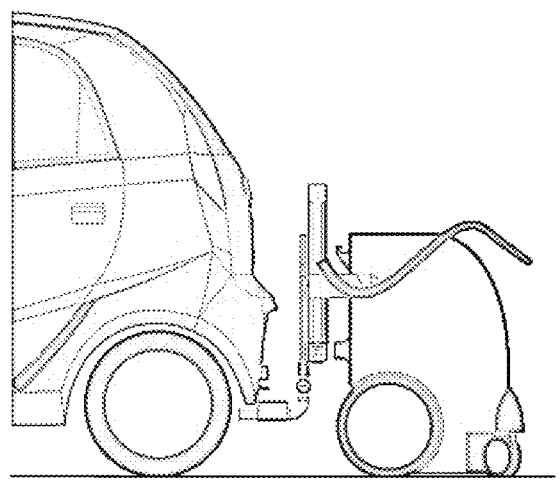

FIG. 8b schematically illustrates the car and the wheel cart of FIG. 8a, when the wheel cart is approaching the vehicle.

Figure 8C:
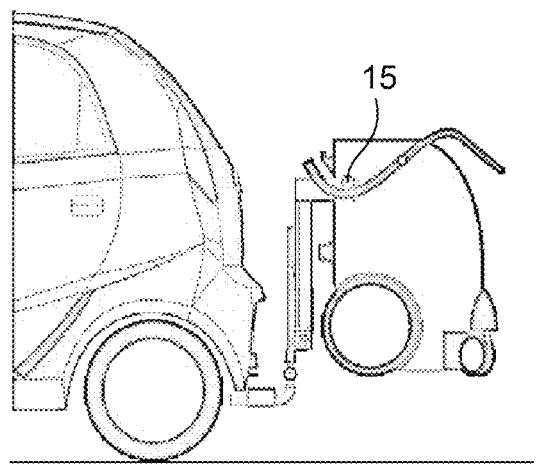

FIG. 8c schematically illustrates the car and the wheel cart of FIG. 2a, when being lifted above the ground.

Figure 9A:
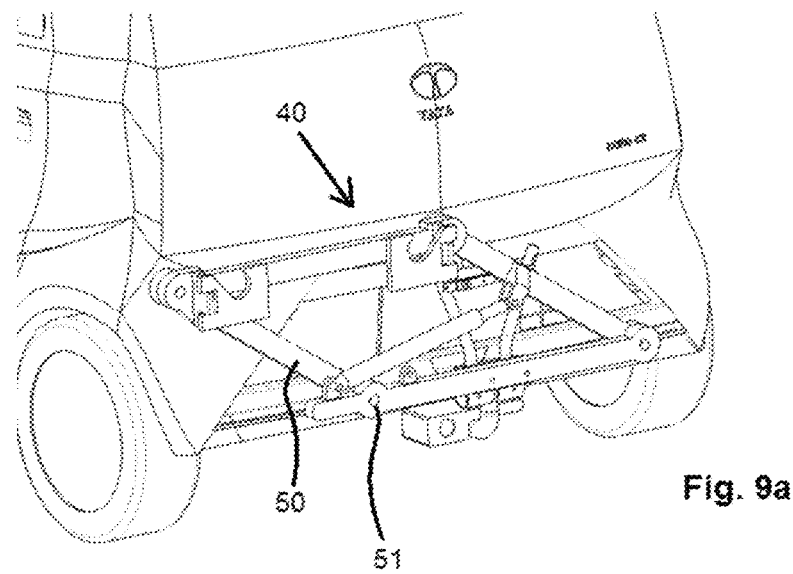
Figure 9B:
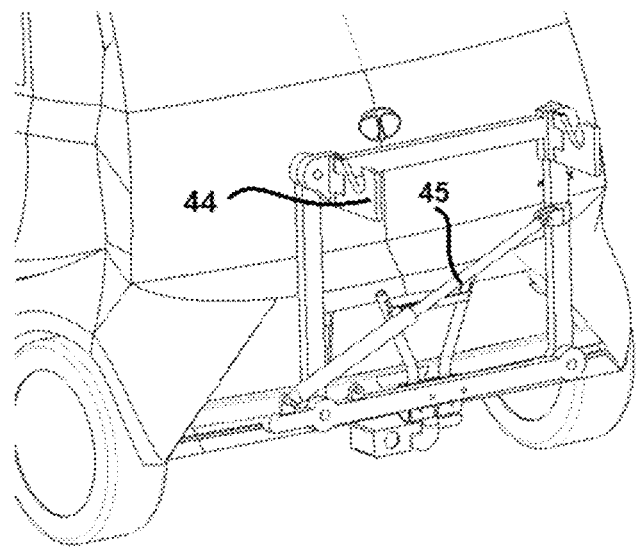

Each of FIGS. 9a and 9b schematically illustrates the operation of a lifting mechanism 40, according to another embodiment of the invention.

It should be understood that the drawings are not necessarily drawn to scale.

DESCRIPTION OF EMBODIMENTS

The present invention will be understood from the following detailed description of preferred embodiments ("best mode"), which are meant to be descriptive and not limiting. For the sake of brevity, some well-known features, methods, systems, procedures, components, circuits, and so on, are not described in detail.

Each of FIGS. 2a, 2b and 2c schematically illustrates a stage of mounting a vehicular mobile storage cart to a car, according to one embodiment of the invention.

FIG. 2a schematically illustrates a car 20 in which a lifting mechanism 40 is installed, according to one embodiment of the invention.

The wheel cart 10 illustrated in this figure is not mounted on the car.

FIG. 2b schematically illustrates the car and the wheel cart of FIG. 2a in a situation where the wheel cart approaches the car. In this figure the vehicular mobile storage cart still stands on the ground.

FIG. 2c schematically illustrates the car and the wheel cart of FIG. 2a, when being lifted above the ground.

The volume of the cabin of the wheel cart 10 is about the volume of a shopping cart. It comprises front and rear wheels, and a handle. The wheels of the wheel cart 10 are as of a supermarket shopping cart, i.e., a pair of rear wheels, and a pair of front wheels. The front wheels are pivotally connected to the wheel cart 10 by vertical hinges (not illustrated) which allows 360 degrees rotation.

The user may take the wheel cart to the supermarket, use the wheel cart as a shopping cart, and then return to his vehicle, mount the wheel cart on his car by lifting mechanism 40, and drive home with the wheel cart connected to the vehicle in the lifted situation thereof. At home he can lower the wheel cart 10, and take it to his house, where he unloads the groceries.

Of course the use of the wheel cart as a shopping cart is merely an example, and the wheel cart may be adapted for many other implementations, such as an external tools box, a food cooler, a food heater, and so on.

As will be detailed hereinafter, the mechanisms used by the wheel cart allow connecting the cart to a vehicle without the need of a user presence between the wheel cart and the vehicle.

The Gripping Mechanism 30

FIG. 3 is a perspective view which schematically illustrates a gripping mechanism 30, according to one embodiment of the invention.

The gripping mechanism 30 comprises two arms 32, each pivotally connected to a chassis 31, as in pliers.

To each of the arms is connected a gripping terminal 34, for gripping a ball coupler of a car hitch (not illustrated in this figure). The object of the gripping terminals 34 is to increase the gripping on a gripped object. For example, if the gripped element is a hitch ball coupler, a gripping terminal in a form of a cylinder provides a ring that grips the ball coupler.

The pivotal connection is between the upper side of the arms and the gripping terminals. This generates a moment which can be taken for planning the gripping power applied on a gripped object.

When the upper side of the arms 32 approaches each other, the gripping terminals 34 move away from each other, and vice versa. Thus, for applying gripping mechanism on a ball coupler of a car hitch, a force has to be applied on the arms to keep away from each other. This purpose is performed by a foldable rod 33.

The foldable rod 33 is connected to the arms 32. In the straight form of the foldable rod 33, the foldable rod applies force on the arms 32 such that the gripping terminals 34 apply force on the gripped object, thereby tightly holding the gripping mechanism 30. When a user folds the foldable rod 33, the gripping mechanism 30 can be removed from the car.

Reference numeral 35 denotes a lock, for retaining the foldable rod 33 straight, thereby preventing removing the gripping mechanism from the gripped object, such as a ball coupler of a car hitch.

Each of FIGS. 4a and 4b schematically illustrates the operation of a gripping mechanism 30, according to one embodiment of the invention.

In FIG. 4a the foldable rod 33 is folded; in FIG. 4b the foldable rod is straight.

When the foldable rod 33 is straight, the arms 32 apply force on the gripping terminals, thereby gripping the ball coupler 22 of a car hitch 21.

When the foldable rod 33 is collapsed, a user can separate the arms 32 from the car hitch ball.

The hidden part of the ball coupler is marked by dashed line.

Numeral 36 denotes a screw as an example of a connector for connecting the gripping mechanism to the lifting mechanism.

The Lifting Mechanism 40

Each of FIGS. 5a and 5b schematically illustrates the operation of a lifting mechanism 40, according to one embodiment of the invention.

The lifting mechanism according to this embodiment of the invention comprises two major parts: a stationary part and a vertically slideable part.

The stationary part comprises a chassis 41, which is connected to the chassis 31 of the gripping mechanism. Two vertical shafts 42 are connected to the chassis 41.

Also connected to the chassis is a motor 43, such as a step motor, electric motor, and the like. The motor 43 rotates a linear actuator 45, which is connected to the vertically slideable part.

The vertically slideable part comprises a horizontal bar 46, and two hooks 44. The linear actuator 45 is pivotally connected to the horizontal bar 46. Each of the hooks 44 is connected to the horizontal bar 46. Each of the hooks 44 is also pivotally connected to one of the vertical shafts 42.

Thus, upon rotating the linear actuator 45 by the motor 43 in one direction, the vertical bar 46 along with the hooks 44 move up, and vice versa.

Each of FIGS. 6a, 6b and 6c schematically illustrates a wheel cart 10 according to one embodiment of the invention, from a different angle.

The wheel cart 10 comprises a cabin 11, two front wheels 12, two rear wheels 13, and a handle 14. The handle 14 is pivotally connected to the cabin by axles 16.

To each side of the wheel cart is attached a stud 15, corresponding with hooks 44.

Element 18 is a female element corresponding to a male element (not illustrated) of the lifting mechanism, for safer towing of the wheel cart.

The motor 17, which is seen in FIG. 6b, can be used for riding the wheel cart, rather than pushing it.

FIG. 7a schematically illustrates the wheel cart 10 in a situation in which a user thereof carries out shopping, according to one embodiment of the invention.

FIG. 7b schematically illustrates the wheel cart 10 in a situation of a user rotating the handle along hinge 16.

FIG. 7c schematically illustrates the wheel cart 10 in a situation in which the wheel cart is carried (lifted) by a car.

As can be seen from these figures, in FIG. 7b the handle is turned by 180 degrees with reference to FIG. 7a. The reason is to allow keeping the handle of the wheel cart away from the car when the car moves, in order to prevent contact between them. Thus, in FIG. 7b the edge of the handle 14 is farther from the car (not illustrated) than in FIG. 7a. When the handle is rotated by 180 degrees, it is more convenient to operate as a cart handle.

FIG. 8a is a side view schematically illustrating a car 20 in which is installed a wheel cart 10, according to one embodiment of the invention.

FIG. 8b schematically illustrates the car and the wheel cart of FIG. 8a, when the wheel cart is approaching the vehicle. In this figure the vehicular mobile storage cart still stands on the ground.

FIG. 8c schematically illustrates the car and the wheel cart of FIG. 2a, when being lifted above the ground.

As illustrated, the hooks 44 slide vertically, and when they move up, they lift studs 15, which are connected to the sides of wheel cart 10. Thus, when connecting the wheel cart to a car, a user does not have to be present between the car and the wheel cart, thereby allowing designing the vehicular mobile storage cart of the present invention to be as close to the rear side of the car as possible (i.e., without touching the car).

In most cases, the weight of the wheel cart is adequate to keep wheel cart 10 on hooks 44. Nevertheless, in order to make sure of no unintentional separation of wheel cart 10 from hooks 44 (e.g., as a result of shaking), a use of a locking mechanism (not illustrated) can be made.

Each of FIGS. 9a and 9b schematically illustrates the operation of a lifting mechanism 40, according to another embodiment of the invention.

According to this embodiment of the invention, the lifting mechanism is based on a parallelogram frame 50, whose bars are pivotally connected by hinges 51. The lower horizontal bar of frame 50 is connected to the gripping mechanism. The angle between the bars of the parallelogram frame 50 is changed by a linear actuator 45.

In FIG. 9a the upper horizontal bar of the parallelogram frame 50 is closer to the lower horizontal bar thereof than in FIG. 9b. Thus, the user connects the wheel cart to hooks 44 when the parallelogram frame 50 is in the state illustrated in FIG. 9a, and then changes the situation of the frame as in FIG. 9b in order to lift the wheel cart.

The linear actuator can be motorized, as well as manual. For the sake of brevity, the motor is not illustrated in these figures.

The advantage of the lifting mechanism illustrated in these figures over the lifting mechanism illustrated in FIGS. 5a and 5b is its simplicity, which is achieved by applying rotational movement rather than linear movement. In mechanics, a rotational movement is preferable to linear movement, especially due to the smaller friction area.

In the figures and/or description herein, the following reference numerals (Reference Signs List) have been mentioned:

numeral 10 denotes a wheel cart, according to one embodiment of the invention;

numeral 11 denotes a cabin of the wheel cart;

numeral 12 denotes a front wheel;

numeral 13 denotes a rear wheel;

numeral 14 denotes a handle;

numeral 15 denotes one of two studs, each disposed at a different side of the wheel cart 10;

numeral 16 denotes a hinge through which handle 14 is pivotally connected to the wheel cart 10;

numeral 17 denotes a motor, for rotating the rear wheels of the wheel cart, thereby making moving the wheel cart more easily than without the motor;

numeral 18 denotes a female element corresponding to a male element of the lifting mechanism, for carrying the wheel cart safer;

numeral 20 denotes a car;

numeral 21 denotes a car hitch;

numeral 22 denotes a ball coupler of car hitch 21;

numeral 30 denotes a gripping mechanism;

numeral 31 denotes a chassis of the gripping mechanism 30;

each of numeral 32 denotes an arm of two arms, pivotally connected to a chassis 31, as in pliers;

numeral 33 denotes a foldable rod, connected to the arms 32, therebetween;

numeral 34 denotes one of two gripping terminals, each connected to one of the arms 32;

numeral 35 denotes a lock of the foldable rod 33;

numeral 36 denotes a bolt as an example of a connector for connecting the gripping mechanism to the lifting mechanism;

numeral 40 denotes a lifting mechanism, according to one embodiment of the invention;

numeral 41 denotes a chassis of the lifting mechanism 40;

each of numeral 42 denotes a vertical shaft;

numeral 43 denotes a motor;

numeral 44 denotes one hook of a pair of hooks, each mounted at different side of the wheel cart 10;

numeral 45 denotes a linear actuator;

numeral 46 denotes a horizontal bar;

numerals 50 denotes a bar of a parallelogram frame;

numeral 51 denotes a hinge for connecting two adjacent bars of parallelogram 50;

numeral 90 denotes a trailer, according to the prior art;

numeral 91 denotes a cabin thereof, numeral 92 denotes a wheel thereof, and numeral 93 denotes a chassis thereof.

In the description herein, the following references have been mentioned:

US20060228201 and

US20080100076A1.

The foregoing description and illustrations of the embodiments of the invention has been presented for the purposes of illustration. It is not intended to be exhaustive or to limit the invention to the above description in any form.

Any term that has been defined above and used in the claims, should to be interpreted according to this definition.

The reference numbers in the claims are not a part of the claims, but rather used for facilitating the reading thereof. These reference numbers should not be interpreted as limiting the claims in any form.

The invention claimed is:

1. A vehicular mobile storage cart, for a car having a hitch (21, 22), said cart comprising:
   (a) a hitch gripping mechanism (30), connectable to the car hitch (21, 22);
   (b) a lifting mechanism (40), connectable to said hitch gripping mechanism (30), said lifting mechanism (40) comprising:
      a parallelogram frame (50) connected to said gripping mechanism (30), said frame having two horizontal bars and two vertical bars pivotally connected to each other;
      a linear actuator (45) for changing an angle between said bars;
      wherein said lifting mechanism being adapted to diminish its dimensions in a folded state thereof to allow opening a back door of a vehicle thereof when being folded; and
      two hooks (44), correspondingly with two studs of a wheel cart;
   (c) a wheel cart (10) comprising:
      a cabin (11) having a handle (14); and
      two studs (15), correspondingly with said two hooks (44), each of said studs being connected to an opposite side of said cabin (11), for connecting to said hooks (44); and
      a locking mechanism, for locking said studs (15) to said hooks (44).

2. The vehicular mobile storage cart according to claim 1, wherein said locking mechanism is combined with said handle (14) of said cart, thereby allowing placing said locking mechanism in a locked state thereof by said handle.

3. The vehicular mobile storage cart according to claim 1, said handle (14) is pivotally connected to said wheel cart (10), thereby allowing changing an orientation of said handle to lock said studs (15) to said hooks (44), thereby implementing said locking mechanism.

4. The vehicular mobile storage cart according to claim 1, wherein said hitch gripping mechanism (30) comprises:
   two gripping arms (32), each having a gripping terminal (34) at one end thereof while the other end thereof is used as a handle to said gripping mechanism;
   a hinge pivotally connecting said arms between the ends thereof;
   a foldable securing rod (33), connected to said arms (32) therebetween, for fixing said gripping mechanism in a locked situation thereof;
   thereby allowing placing a car hitch element (22) between said gripping terminals (34), and locking said foldable rod (33) in a straight state thereof, for gripping said car hitch element (22).

5. The vehicular mobile storage cart according to claim 3, wherein said hitch gripping mechanism is adapted to be used with a car hitch element (22) in a form of a ball.

6. The vehicular mobile storage cart according to claim 3, further comprising a lock (35), for preventing an unauthorized person from releasing a connection between said hitch gripping mechanism (30) and said hitch.

7. The vehicular mobile storage cart according to claim 1, wherein said wheel cart comprises a motor (17), for rotating one or more of the wheels of the wheel cart.

8. The vehicular mobile storage cart according to claim 1, wherein said wheel cart further comprises a hook (18) into which a pin of the lifting mechanism (40) can be placed, for safer towing of the wheel cart than without the pin.

9. The vehicular mobile storage cart according to claim 1, further comprising a mechanism for securing said studs (15) to said hooks (44), thereby preventing said wheel cart (11) from disconnecting from said hooks (44).

* * * * *